United States Patent
Kobayashi et al.

(10) Patent No.: US 11,840,450 B2
(45) Date of Patent: Dec. 12, 2023

(54) HYDROGEN PRODUCTION APPARATUS, HYDROGEN PRODUCTION METHOD, SILICON FINE PARTICLES FOR HYDROGEN PRODUCTION, AND PRODUCTION METHOD FOR SILICON FINE PARTICLES FOR HYDROGEN PRODUCTION

(71) Applicant: NISSHIN KASEI CO., LTD., Osaka (JP)

(72) Inventors: Hikaru Kobayashi, Kyoto (JP); Toru Higo, Osaka (JP); Yayoi Kanatani, Osaka (JP)

(73) Assignee: NISSHIN KASEI CO., LTD., Osaka (JP)

( * ) Notice: Subject to any disclaimer, the term of this patent is extended or adjusted under 35 U.S.C. 154(b) by 115 days.

(21) Appl. No.: 17/314,089

(22) Filed: May 7, 2021

(65) Prior Publication Data
US 2021/0300756 A1 Sep. 30, 2021

Related U.S. Application Data

(62) Division of application No. 14/916,650, filed as application No. PCT/JP2014/072219 on Aug. 26, 2014, now abandoned.

(30) Foreign Application Priority Data

Sep. 5, 2013 (JP) .................................. 2013-184481
Feb. 28, 2014 (JP) .................................. 2014-038422

(51) Int. Cl.
*C01B 3/06* (2006.01)
*B01J 8/02* (2006.01)
(Continued)

(52) U.S. Cl.
CPC .................. *C01B 3/06* (2013.01); *B01J 7/02* (2013.01); *B01J 8/02* (2013.01); *B01J 8/20* (2013.01);
(Continued)

(58) Field of Classification Search
CPC .. C01B 3/06; C01B 33/021; B01J 7/02; B01J 8/02; B01J 8/20; B01J 2208/00592; B01J 2208/024; Y02E 60/36
See application file for complete search history.

(56) References Cited

U.S. PATENT DOCUMENTS

| 4,800,187 A | 1/1989 | Lachman et al. |
| 2005/0042165 A1 | 2/2005 | Akiyama et al. |

(Continued)

FOREIGN PATENT DOCUMENTS

| CN | 1673068 A | 9/2005 |
| JP | H04-059601 A | 2/1992 |

(Continued)

OTHER PUBLICATIONS

Judge "A Study of the Dissolution of SiO2 in Acidic Fluoride Solutions", J. Electrochem. Soc., vol. 118, No. 11, p. 1772-1775 (Year: 1971).*

(Continued)

*Primary Examiner* — Steven J Bos
*Assistant Examiner* — Syed T Iqbal

(57) ABSTRACT

An exemplary hydrogen production apparatus 100 according to the present invention includes a grinding unit 10 configured to grind a silicon chip or a silicon grinding scrap 1 to form silicon fine particles 2, and a hydrogen generator 70 configured to generate hydrogen by causing the silicon fine particles 2 to contact with as well as disperse in, or to contact with or dispersed in water or an aqueous solution. The hydrogen production apparatus 100 can achieve reliable production of a practically adequate amount of hydrogen (Continued)

from a start material of silicon chips or silicon grinding scraps that are ordinarily regarded as waste. The hydrogen production apparatus thus effectively utilizes the silicon chips or the silicon grinding scraps so as to contribute to environmental protection as well as to significant reduction in cost for production of hydrogen that is utilized as an energy source in the next generation.

6 Claims, 15 Drawing Sheets

(51) Int. Cl.
    *C01B 33/021* (2006.01)
    *B01J 7/02* (2006.01)
    *B01J 8/20* (2006.01)
(52) U.S. Cl.
    CPC ... *C01B 33/021* (2013.01); *B01J 2208/00592* (2013.01); *B01J 2208/024* (2013.01); *Y02E 60/36* (2013.01)

(56) References Cited

U.S. PATENT DOCUMENTS

| | | | |
|---|---|---|---|
| 2007/0218657 A1 | 9/2007 | Bet | |
| 2012/0275981 A1* | 11/2012 | Foord | C09C 1/00 |
| | | | 423/658.2 |
| 2013/0078756 A1 | 3/2013 | Ferstl et al. | |
| 2014/0134778 A1 | 5/2014 | Ferstl | |

FOREIGN PATENT DOCUMENTS

| | | |
|---|---|---|
| JP | 2000-019303 A | 1/2000 |
| JP | 2004-115349 A | 4/2004 |
| JP | 2005-200283 A | 7/2005 |
| JP | 2006-240935 A | 9/2006 |
| JP | 2011-236107 A | 11/2011 |
| JP | 2012-229146 A | 11/2012 |
| TW | 201209157 A1 | 3/2012 |
| WO | 2011/058317 A1 | 5/2011 |
| WO | 2011/154875 A1 | 12/2011 |

OTHER PUBLICATIONS

International Search Report for PCT/JP2014/072219, dated Dec. 2, 2014.
Written Opinion of the International Searching Authority for PCT/JP2014/072219, dated Dec. 2, 2014.
Masanori Maeda et al., "Fabrication of Visible Light Luminescent Si Nanoparticles from Si Swarf", the 74th JSAP Autumn Meeting 2013 Koen Yokoshu, Aug. 31, 2013, p. 14-139.
Taiwan Intellectual Property Bureau Ministry of Economic Affairs, Office Action for Taiwanese patent application No. 103130219, dated Feb. 9, 2018.
MyIPO, Substantive Examination Adverse Report for Malaysia Patent Application No. PI2016700733, dated Feb. 14, 2020.
MyIPO, Search Report (Examiner's Report to the Registrar) for Malaysia Patent Application No. PI2016700733, dated Feb. 14, 2020.
Japan Patent Office, Japanese Office Action for Japanese Patent Application No. 2018-240783, dated Feb. 4, 2020.
Japan Patent Office, Japanese Office Action for Japanese Patent Application No. 2015-535431, dated Aug. 7, 2018 (Machine Translation thereof is attached hereto).
Japan Patent Office, Office Action for Japanese Patent Application No. 2020-096641, dated Mar. 23, 2021 (A machine translation is attached hereto).
Tsuchiya et al., Alkali Treatment of Metallic Silicon Discharged from Grind Process of Silicon Wafer, 2005, 16, (6), pp. 540-544, Japan Society of Waste Management Experts, Japan.
Frogbogbo et al., "On-Demand Hydrogen Generation using Nanosilicon: Splitting Water without Light, Heat, or Electricity" Jan. 2013, Nano Letters, 13, p. 451-456.
USPTO, Non-Final Office Action including List of references for U.S. Appl. No. 14/916,650, dated Oct. 19, 2016.
USPTO, Final Office Action including List of references for U.S. Appl. No. 14/916,650, dated Aug. 17, 2017.
USPTO, Advisory Action including List of references for U.S. Appl. No. 14/916,650, dated Jan. 18, 2018.
USPTO, Non-Final Office Action including List of references for U.S. Appl. No. 14/916,650, dated Oct. 5, 2018.
USPTO, Final Office Action including List of references for U.S. Appl. No. 14/916,650, dated Mar. 28, 2019.
USPTO, Non-Final Office Action including List of references for U.S. Appl. No. 14/916,650, dated Sep. 30, 2019.
Anthony et al. "Photoluminescence quantum yields of amorphous and crystalline silicon nanoparticles" Physical Review B 80, 115407 2009 (Year: 2009) (Cited in "Notice of References Cited," issued with Non-Final Office Action for U.S. Pat. No. 143916650 dated Sep. 30, 2019 (Cite No. 17 of Non-Patent Literature Documents in this list)).
Akhavan et al. "Evolution of Hydrophobicity in Plasma Polymerised 1, 7-Octadiene Films" Plasma Process. Polym. 2013 1018-1029 (Year: 2013) (Cited in "Notice of References Cited," issued with Non-Final Office Action for U.S. Pat. No. 143916650 dated Sep. 30, 2019 (Cite No. 17 of Non-Patent Literature Documents in this list)).
USPTO, Final Office Action including List of references for U.S. Appl. No. 14/916,650, dated Apr. 16, 2020.
Zhao et al. "Quantum confinement in nanometer-sized silicon crystallites" Dec. 1995, Physical Review B, vol. 50, No. 21, p. 18654-18657 (Year: 1994) (Cited in "Notice of References Cited," issued with Final Office Action for U.S. Pat. No. 143916650 dated Apr. 16, 2020 (Cite No. 20 of Non-Patent Literature Documents in this list)).
USPTO, Non-Final Office Action including List of references for U.S. Appl. No. 14/916,650, dated Jan. 8, 2021.
Japan Patent Office, Office Action for Japanese Patent Application No. 2021-178609, dated Jan. 10, 2023.
MyIPO, Substantive Examination Adverse Report for Malaysia Patent Application No. PI2020002493, dated Jun. 22, 2023.
MyIPO, Search Report (Examiner's Report to the Registrar) for Malaysia Patent Application No. PI2020002493, dated Jun. 22, 2023.

* cited by examiner

US 11,840,450 B2

HYDROGEN PRODUCTION APPARATUS, HYDROGEN PRODUCTION METHOD, SILICON FINE PARTICLES FOR HYDROGEN PRODUCTION, AND PRODUCTION METHOD FOR SILICON FINE PARTICLES FOR HYDROGEN PRODUCTION

This application is a divisional application of U.S. application Ser. No. 14/916,650 filed Mar. 4, 2016, which is the National Stage of International Application No. PCT/JP2014/072219 filed Aug. 26, 2014 which claims the benefits of Japanese Patent Application No. 2013-184481 filed Sep. 5, 2013 and Japanese Patent Application No. 2014-038422 filed Feb. 28, 2014. International Application No. PCT/JP2014/072219, patent application Ser. No. 14/916,650, and Japanese Patent Application Nos. 2013-184481 and 2014-038422 are hereby incorporated by reference in their entireties.

TECHNICAL FIELD

The present invention relates to a hydrogen production apparatus, a hydrogen production method, silicon fine particles for hydrogen production, and a production method for silicon fine particles for hydrogen production.

BACKGROUND ART

Fuel cells have recently been attracting attention as one of possible energy sources in the next generation in terms of resource exhaustion prevention and environmental protection. Accordingly, development in technique of producing hydrogen included in fuel cells as fuel substituting for petroleum will largely influence success in upcoming development in the fuel cell field. There has been disclosed a conventional technique of producing hydrogen as such an energy source by causing silicon fine powder having an average particle diameter of 2 μm (micron) or less to contact with water (e.g., Patent Document 1).

As to silicon powder, the inventors of the present application have disclosed a method for producing silicon fine particles, other than grinding a silicon wafer into fine particles, from silicon particles so-called chip powder that is obtained upon forming a thin substrate (wafer) from a silicon base material (ingot). The inventors of the present application have also disclosed a technique of applying the obtained silicon fine particles to silicon ink or a solar cell (e.g., Patent Document 2).

PRIOR ART DOCUMENT

Patent Documents

Patent Document 1: JP 2004-115349 A
Patent Document 2: JP 2012-229146 A

SUMMARY OF THE INVENTION

Problems to be Solved by the Invention

However, the conventionally disclosed technique of producing hydrogen achieves a hydrogen gas generation amount only in the range from 0.2 mmol (millimolar) to 2.9 mmol in a case where 15 g of silicon powder is caused to react for one hour, and fails to reach an adequate generation amount for actual industrial application.

It is desired, in terms of effective resource utilization and environmental protection, to effectively utilize silicon particles that are obtained from chips formed by cutting silicon or silicon grinding scraps, which are ordinarily dealt as waste.

The present invention solves at least one of the technical problems mentioned above, and significantly contributes to achievement of a hydrogen production apparatus and a hydrogen production method that effectively utilize silicon waste and are excellent in economical and industrial efficiency.

Solutions to the Problems

The inventors of the present application have devoted themselves to intensive researches in a practically and industrially excellent hydrogen production technique by focusing on effective utilization of silicon fine scraps or chips (hereinafter, also generally called "silicon chips") or silicon grinding scraps, which are ordinarily discarded as a large amount of waste, in silicon cutting in a production process of semiconductor products in the semiconductor field. The inventors finally have found that silicon waste can be utilized effectively and a large amount of hydrogen can be produced even under a moderate condition. The present invention has been devised in view of the above point.

An exemplary hydrogen production apparatus according to the present invention includes: a grinding unit configured to grind a silicon chip or a silicon grinding scrap to form silicon fine particles; and a hydrogen generator configured to generate hydrogen by causing the silicon fine particles to contact with as well as disperse in, or to contact with or dispersed in water or an aqueous solution.

This hydrogen production apparatus can achieve reliable production of a practically adequate amount of hydrogen from a start material of silicon chips or silicon grinding scraps that are obtained by silicon cutting in a production process of semiconductor products or the like and are ordinarily dealt as waste. This hydrogen production apparatus thus effectively utilizes silicon chips or silicon grinding scraps ordinarily regarded as waste so as not only to significantly contribute to environmental protection, but also to achieve significant reduction in cost for production of hydrogen that is utilized in a fuel cell or the like as an energy source in the next generation. This hydrogen production apparatus can thus markedly improve industrial productivity in hydrogen production.

An exemplary hydrogen production method according to the present invention includes: a grinding step of grinding a silicon chip or a silicon grinding scrap to form silicon fine particles; and a hydrogen generating step of generating hydrogen by causing the silicon fine particles to contact with as well as disperse in, or to contact with or dispersed in water or an aqueous solution.

This hydrogen production method can achieve reliable production of a practically adequate amount of hydrogen from a start material of silicon chips or silicon grinding scraps that are obtained by silicon cutting in a production process of semiconductor products or the like and are ordinarily dealt as waste. This hydrogen production method thus effectively utilizes silicon chips or silicon grinding scraps ordinarily regarded as waste so as not only to significantly contribute to environmental protection, but also to achieve significant reduction in cost for production of hydrogen that is utilized in a fuel cell or the like as an energy source in the next generation. This hydrogen production method can thus markedly improve industrial productivity in hydrogen production.

An exemplary silicon fine particle for hydrogen production according to the present invention has an amorphous shape and a crystallite diameter distribution in the range of 100 nm (nanometer) or less. Among silicon fine particles formed by grinding silicon chips or silicon grinding scraps, a silicon fine particle obtained through chemical treatment (typically, oxide film removal using an aqueous hydrofluoric acid solution and/or an aqueous ammonium fluoride solution or hydrophilization using a fourth liquid in each embodiment to be described later) preferably exemplify the above silicon fine particles for hydrogen production.

An exemplary production method for silicon fine particles for hydrogen production according to the present invention includes a grinding step of grinding a silicon chip or a silicon grinding scrap to form silicon fine particles.

The silicon fine particles for hydrogen production and the production method for the silicon fine particles for hydrogen production can achieve provision of an intermediate material that enables reliable production of a practically adequate amount of hydrogen from silicon chips or silicon grinding scraps that are obtained by silicon cutting in a production process of semiconductor products or the like and are ordinarily dealt as waste.

Effects of the Invention

The exemplary hydrogen production apparatus according to the present invention and the exemplary hydrogen production method according to the present invention can achieve reliable production of a practically adequate amount of hydrogen from a start material of silicon chips or silicon grinding scraps that are ordinarily regarded as waste. The hydrogen production apparatus and the hydrogen production method thus effectively utilize silicon chips or silicon grinding scraps regarded as waste so as to contribute to environmental protection as well as to significant reduction in cost for production of hydrogen that is utilized as an energy source in the next generation. The exemplary silicon fine particles for hydrogen production according to the present invention and the exemplary production method for the silicon fine particles for hydrogen production can provide an intermediate material that enables reliable production of a practically adequate amount of hydrogen from silicon chips or silicon grinding scraps that are obtained by silicon cutting in a production process of semiconductor products or the like and are ordinarily regarded as waste.

DESCRIPTION OF REFERENCE SIGNS

Figure 1:
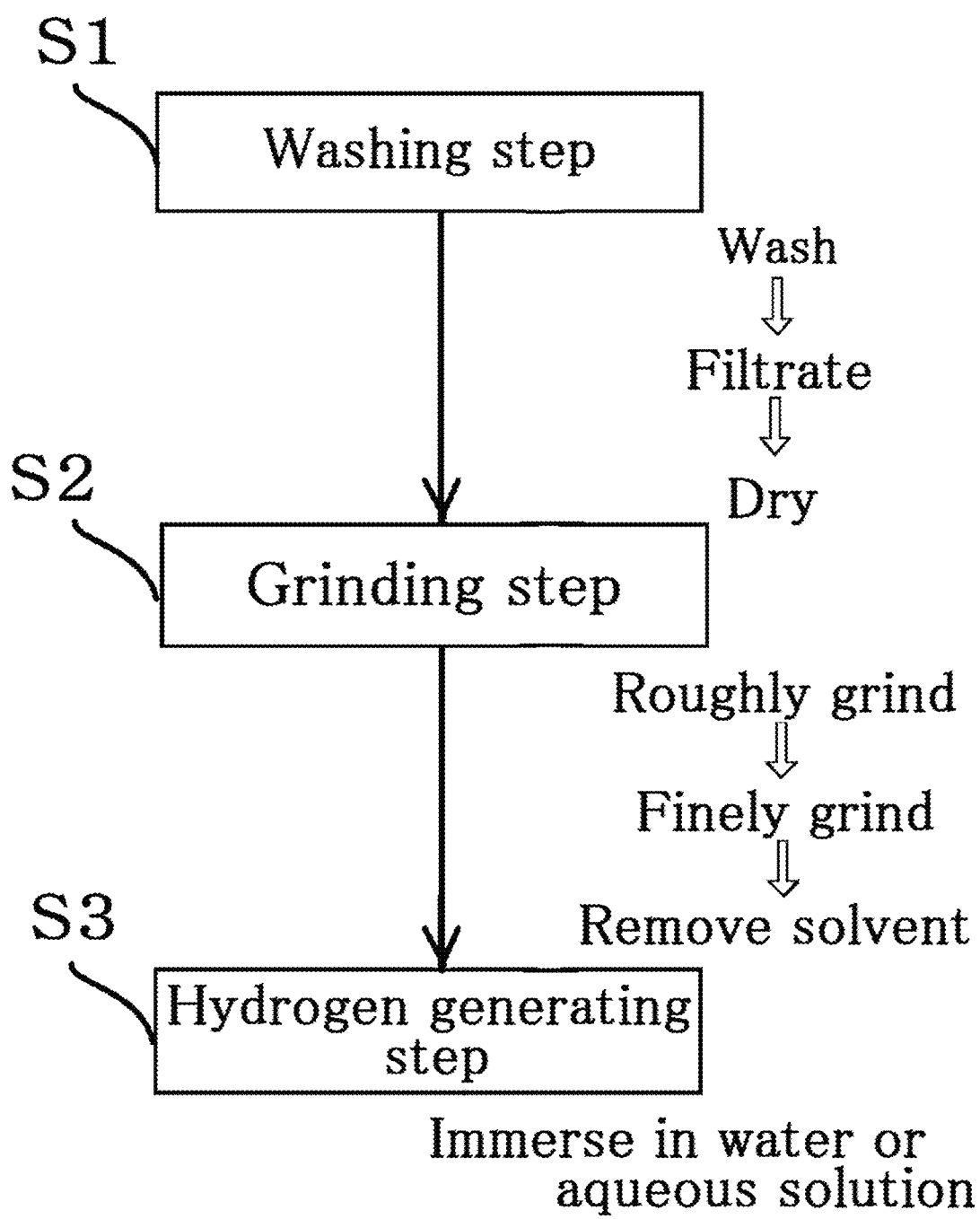
FIG. 1 is a flowchart of respective steps in a hydrogen production method according to a first embodiment.

1 Silicon scrap material
2 Silicon fine particle
3 Silicon fine particle after surface oxide film removal
4 Silicon fine particle after hydrophilization treatment
5 Hydrogen
10 Grinder
14 Discharge port
15 Filter
30 Drying chamber
40 Rotary evaporator
50 Surface oxide film removal tank
57, 67, 77 Agitator
58 Centrifuge
60 Hydrophilization treatment tank
70 Hydrogen generator
72 Reaction tank
75 Water or aqueous solution
79 Transfer pipe
80 Water tank
87 Hydrogen collector
89 Hydrogen pipe
90 Hydrogen reservoir
100, 200 Hydrogen production apparatus
250 Additional surface oxide film removal tank
270 Additional hydrogen generator

EMBODIMENTS OF THE INVENTION

Embodiments of the present invention will now be described in detail with reference to the accompanying drawings. Common parts will be denoted by common reference signs in all the drawings in this disclosure unless otherwise specified. Elements according to the respective embodiments will not always be depicted at relative scale ratios. Some of the reference signs may not appear in the drawings for better visual.

1. Hydrogen Production Method

First Embodiment

A hydrogen production method according to the present embodiment includes various steps of using an exemplary start material of silicon chips or silicon grinding scraps (hereinafter, also referred to as a silicon scrap material), which are obtained by silicon cutting in a production process of semiconductor products and are ordinarily regarded as waste. The silicon scrap material also includes fine scraps obtained by grinding a waste wafer. FIG. 1 is a flowchart of the respective steps in the hydrogen production method according to the present embodiment. As depicted in FIG. 1, the hydrogen production method according to the present embodiment includes the following steps (1) to (3).

(1) Washing step (S1)
(2) Grinding step (S2)
(3) Hydrogen generating step (S3)
(1) Washing Step The washing step (S1) according to the present embodiment includes washing the silicon scrap material that is generated in a process of cutting a monocrystal or polycrystal silicon ingot or the like. The washing step (S1) is executed mainly for removal of organic matters adhering to the silicon scrap material, such as cutting oil and an additive used in the process of cuttings. The silicon scrap material to be washed is initially weighed, and then a predetermined first liquid is added and the silicon scrap material is dispersed in the liquid by using a ball mill. The ball mill according to the present embodiment is a grinder configured to grind a steel ball, a magnetic ball, a boulder, and a similar object. The first liquid according to the present embodiment is, for example, acetone.

The silicon scrap material having been treated in the washing step is caused to pass through a filter for removal of the first liquid by means of suction filtration. The removed first liquid is disposed as a waste liquid. The filtrated silicon scrap material is dried using a drier. The drying temperature according to the present embodiment is, for example, 40° C. or higher and 60° C. or lower. The ball mill is used in the washing step according to the present embodiment, so that it is possible to markedly improve washing efficiency in comparison to simple immersion in the first liquid.

(2) Grinding Step

The subsequent grinding step (S2) includes grinding washed silicon sludge to form silicon fine particles having a crystallite diameter of 100 nm or less. Such silicon fine particles having a crystallite diameter of 100 nm or less can achieve preferred effects, or effects similar to those of the present embodiment, even in a case where the silicon fine particles have an aggregated particle distribution in the range of 100 nm or more and 5 μm or less. A predetermined second liquid is then added to the washed silicon sludge. The second liquid is, for example, propanol. Rough grinding treatment is subsequently executed using the ball mill. The roughly ground silicon scrap material is caused to pass through a filter for removal of relatively coarse particles, and the remaining silicon scrap material is finely ground using a bead mill. The second liquid is subsequently removed using a rotary evaporator to obtain silicon fine particles as a finely ground object.

The grinding step (S2) according to the present embodiment enables formation of silicon fine particles that have amorphous shapes, a crystallite diameter distribution in the range of 100 nm, and hydrophilic surfaces. The grinding step (S2) enables grinding treatment by using any one selected from the grinder group consisting of a bead mill, a ball mill, a jet mill, and a shock wave grinder, or using any one of combinations thereof (3) Hydrogen Generating Step The subsequent hydrogen generating step (S3) includes generating hydrogen by causing the silicon fine particles obtained in the grinding step (S2) to contact with and/or disperse in water or an aqueous solution. The water used in the hydrogen generating step is not necessarily pure water but may be water containing an electrolyte or an organic matter such as ordinary tap water or industrial water. The aqueous solution according to the present embodiment is also not particularly limited in terms of its type. The aqueous solution is not particularly limited in terms of its hydrogen ion concentration index (pH value), but is more preferred to have a pH value of 10 or more. It is because, the inventors have analyzed to find a tendency that a higher pH value leads to faster hydrogen generation speed and hydrogen generation reaction is finished in a shorter period of time. Accordingly, in order to continuously supply a small amount of hydrogen for a long period of time, the pH value of the aqueous solution is decreased intentionally in a preferred aspect. In contrast, in order to temporarily supply a large amount of hydrogen, increase in pH value of the aqueous solution can achieve hydrogen production compliant with requests from various industrial fields or users of various devices.

The water used in the hydrogen generating step can be set to an appropriate temperature for achievement of desired hydrogen generation speed. Measures to cause the silicon fine particles to contact with and/or disperse in the water or the aqueous solution can be selected from agitation, water current, shaking, and the like as necessary. Agitation or the like promotes hydrogen generation reaction, so that hydrogen production speed can be increased.

As described above, the hydrogen production method according to the present embodiment can achieve reliable production of a practically adequate amount of hydrogen from a start material of silicon chips or silicon grinding scraps that are obtained by silicon cutting in a production process of semiconductor products or the like and are ordinarily regarded as waste. Accordingly, the hydrogen production method effectively utilize silicon chips or silicon grinding scraps regarded as waste so as to contribute to environmental protection as well as to significant reduction in cost for production of hydrogen that is utilized as an energy source in the next generation. It is noted that the present embodiment can achieve production of a large amount of hydrogen at the practical level without including a complicated step.

Second Embodiment

The present embodiment is similar to the first embodiment except that a surface oxide film removing step of removing oxide films on the surfaces of silicon fine particles is additionally executed after the grinding step according to the first embodiment.

Figure 2:
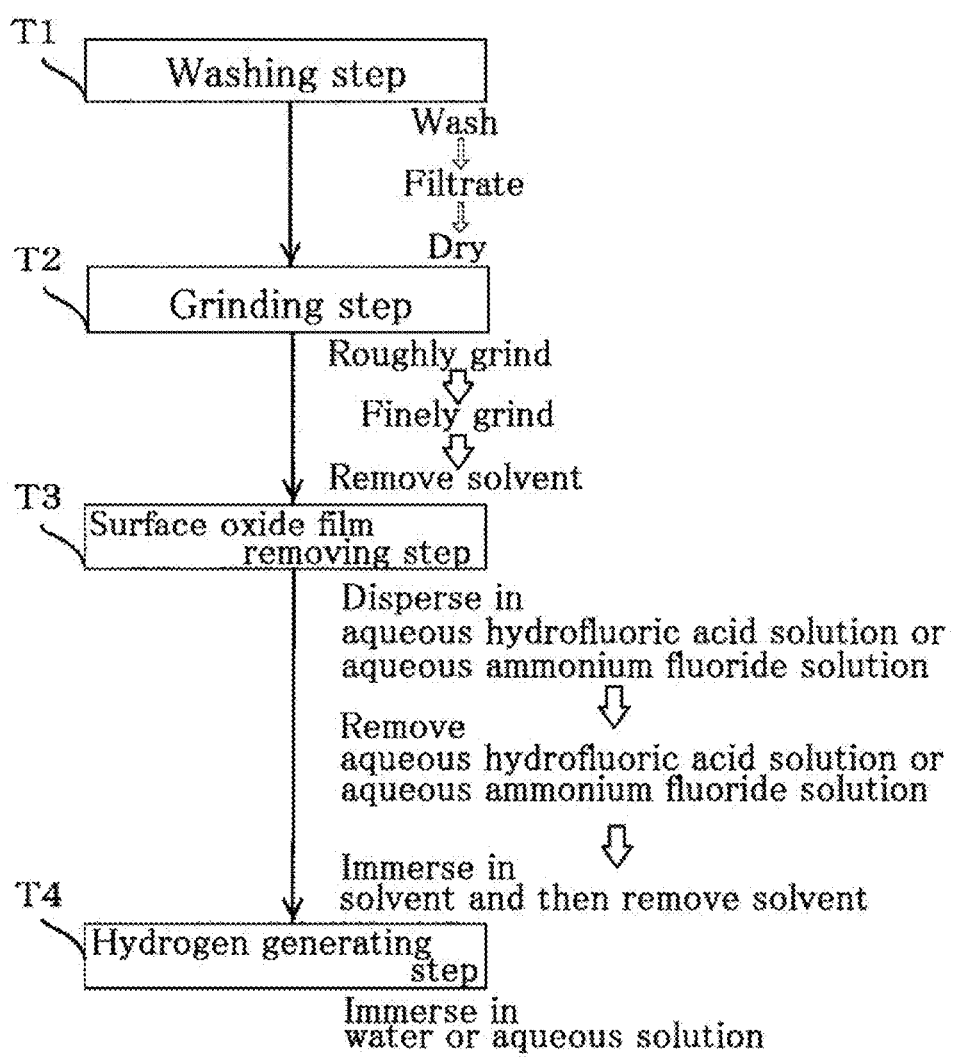
FIG. 2 is a flowchart of respective steps in a hydrogen production method according to a second embodiment.

FIG. 2 is a flowchart of the respective steps in the hydrogen production method according to the present embodiment. As depicted in FIG. 2, the hydrogen production method according to the present embodiment includes the following steps (1) to (4).

(1) Washing step (T1)
(2) Grinding step (T2)
(3) Surface oxide film removing step (T3)
(4) Hydrogen generating step (T4)

As mentioned above, the washing step (S1), the grinding step (S2), and the hydrogen generating step (S3) in the hydrogen production method according to the first embodiment have the details overlapped with those in the washing step (T1), the grinding step (T2), and the hydrogen generating step (T4) according to the present embodiment. Accordingly, those steps other than the surface oxide film removing step (T3) will not be described repeatedly.

The surface oxide film removing step (T3) will be described below.

The surface oxide film removing step (T3) includes causing the silicon fine particles obtained in the grinding step (T2) described above to contact with an aqueous hydrofluoric acid solution or an aqueous ammonium fluoride solution. According to the present embodiment, the silicon fine particles that are obtained in the grinding step (T2) and have a crystallite diameter in the range of 100 nm or less are immersed in the aqueous hydrofluoric acid solution or the aqueous ammonium fluoride solution. The silicon fine particles are thus caused to contact with and/or disperse in the aqueous hydrofluoric acid solution or the aqueous ammonium fluoride solution. The silicon fine particles and the aqueous hydrofluoric acid solution are subsequently separated using a centrifuge. The silicon fine particles are immersed in a third liquid such as an ethanol solution. The third liquid is then removed to obtain silicon fine particles for hydrogen production.

The surface oxide film removing step according to the present embodiment includes immersing the silicon fine particles in the aqueous hydrofluoric acid solution or the aqueous ammonium fluoride solution, so that the silicon fine particles are caused to contact with the aqueous hydrofluoric acid solution or the aqueous ammonium fluoride solution. However, the surface oxide film removing step according to the present embodiment is not limited into these modes. It is possible to alternatively adopt the step of causing the silicon fine particles to contact with the aqueous hydrofluoric acid solution or the aqueous ammonium fluoride solution in a different manner. According to a different adoptable aspect, the aqueous hydrofluoric acid solution or the aqueous ammonium fluoride solution can be sprayed, in other words, showered, to the silicon fine particles.

The subsequent hydrogen generating step (T4) includes generating hydrogen by causing the silicon fine particles after surface oxide film removal to contact with and/or disperse in water or an aqueous solution.

The hydrogen production method according to the present embodiment can achieve effects similar to those according to the first embodiment as well as can achieve increase in hydrogen production amount by removing the oxide films on the surfaces of the silicon fine particles.

Third Embodiment

The present embodiment is similar to the second embodiment except that a hydrophilization treatment step of hydrophilizing the surfaces of the silicon fine particles is additionally executed after the surface oxide film removing step according to the second embodiment.

Figure 3:
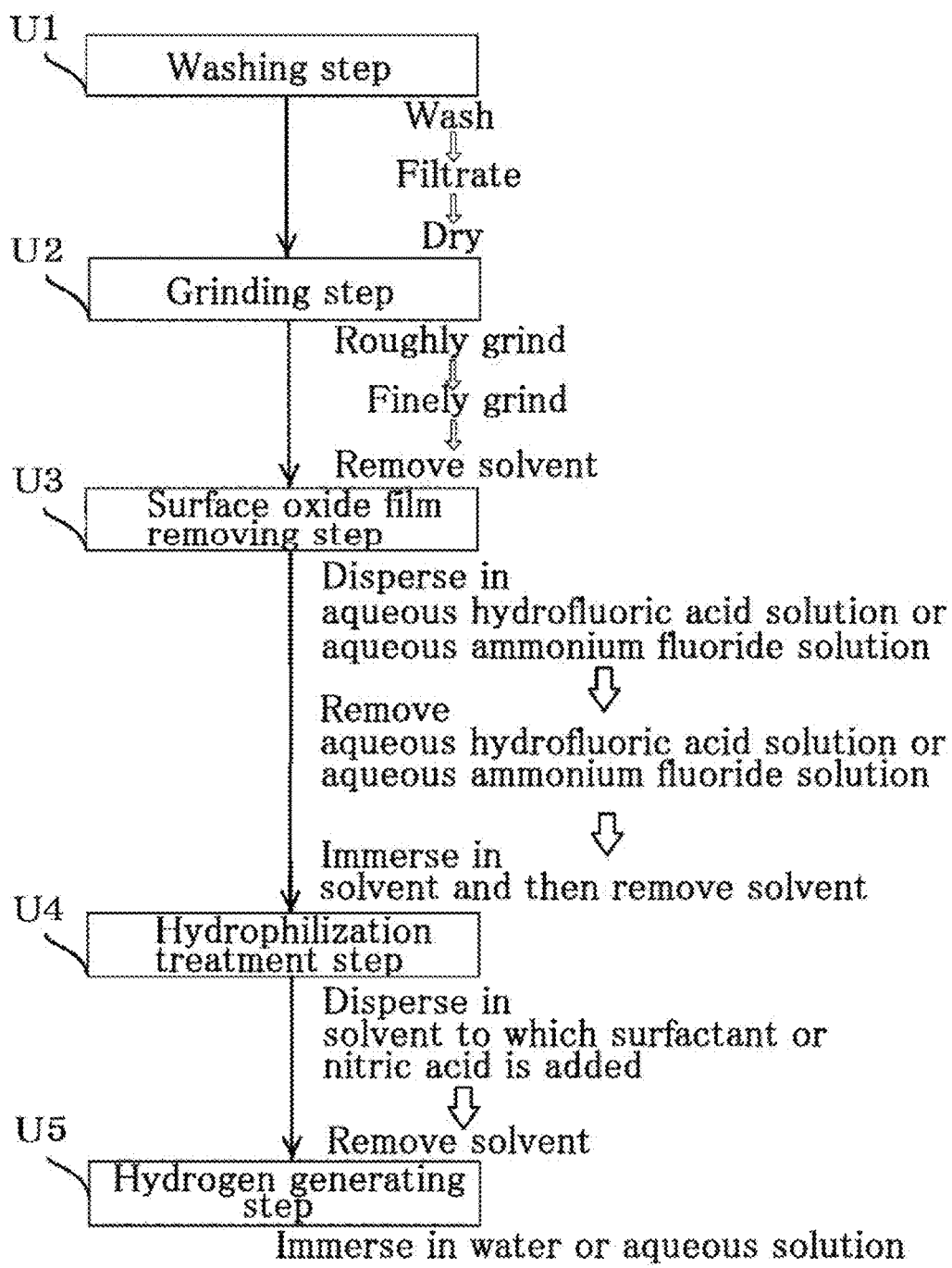
FIG. 3 is a flowchart of respective steps in a hydrogen production method according to a third embodiment.

FIG. 3 is a flowchart of the respective steps in the hydrogen production method according to the present embodiment. As depicted in FIG. 3, the hydrogen production method according to the present embodiment includes the following steps (1) to (5).

(1) Washing step (U1)
(2) Grinding step (U2)
(3) Surface oxide film removing step (U3)
(4) Hydrophilization treatment step (U4)
(5) Hydrogen generating step (U5)

As mentioned above, the washing step (T1), the grinding step (T2), the surface oxide film removing step (T3), and the hydrogen generating step (T4) in the hydrogen production method according to the second embodiment have the details overlapped with those in the washing step (U1), the grinding step (U2), the surface oxide film removing step (U3), and the hydrogen generating step (U5) according to the present embodiment. Accordingly, those steps other than the hydrophilization treatment step (U4) will not be described repeatedly.

The hydrophilization treatment step (U4) will be described below.

The hydrophilization treatment step (U4) according to the present embodiment is executed after the surface oxide film removing step and includes treating the surfaces of the silicon fine particles with a surfactant or nitric acid. Typical examples of the surfactant used for the treatment include at least one selected from the group consisting of an anionic surfactant, a cationic surfactant, and a nonionic surfactant. According to the present embodiment, the silicon fine particles are caused to contact with and/or disperse in a fourth liquid such as propanol, the surfactant or nitric acid is added, and the resulting liquid is agitated. The fourth liquid is removed using a rotary evaporator after the agitation in the present embodiment.

The subsequent hydrogen generating step (U5) includes generating hydrogen by causing the silicon fine particles after hydrophilization treatment to contact with and/or disperse in water or an aqueous solution.

The hydrogen production method according to the present embodiment can achieve effects similar to those according to the first embodiment as well as can decrease surface tension of the silicon fine particles by the hydrophilization treatment step to reliably suppress the silicon fine particles from floating to the water surface, which is a phenomenon unique to fine particles. The silicon fine particles are thus well blended with the water or the aqueous solution to achieve an increase in contact area between the silicon fine particles and the water or the aqueous solution and promotion of hydrogen generation reaction. It is thus possible to markedly increase the hydrogen production amount.

As described above, among the silicon fine particles formed by grinding silicon chips or silicon grinding scraps, silicon fine particles obtained through chemical treatment (typically, oxide film removal treatment using the aqueous hydrofluoric acid solution or the aqueous ammonium fluoride solution in the second embodiment, or hydrophilization treatment using the fourth liquid in the third embodiment) preferably exemplify the silicon fine particles for hydrogen production according to each of the above embodiments. According to a preferred aspect in terms of further promoted hydrogen generation, each of the above embodiments includes the chemical treatment step of chemically treating the silicon fine particles as described above.

2. Hydrogen Production Apparatus

Fourth Embodiment

Figure 4:
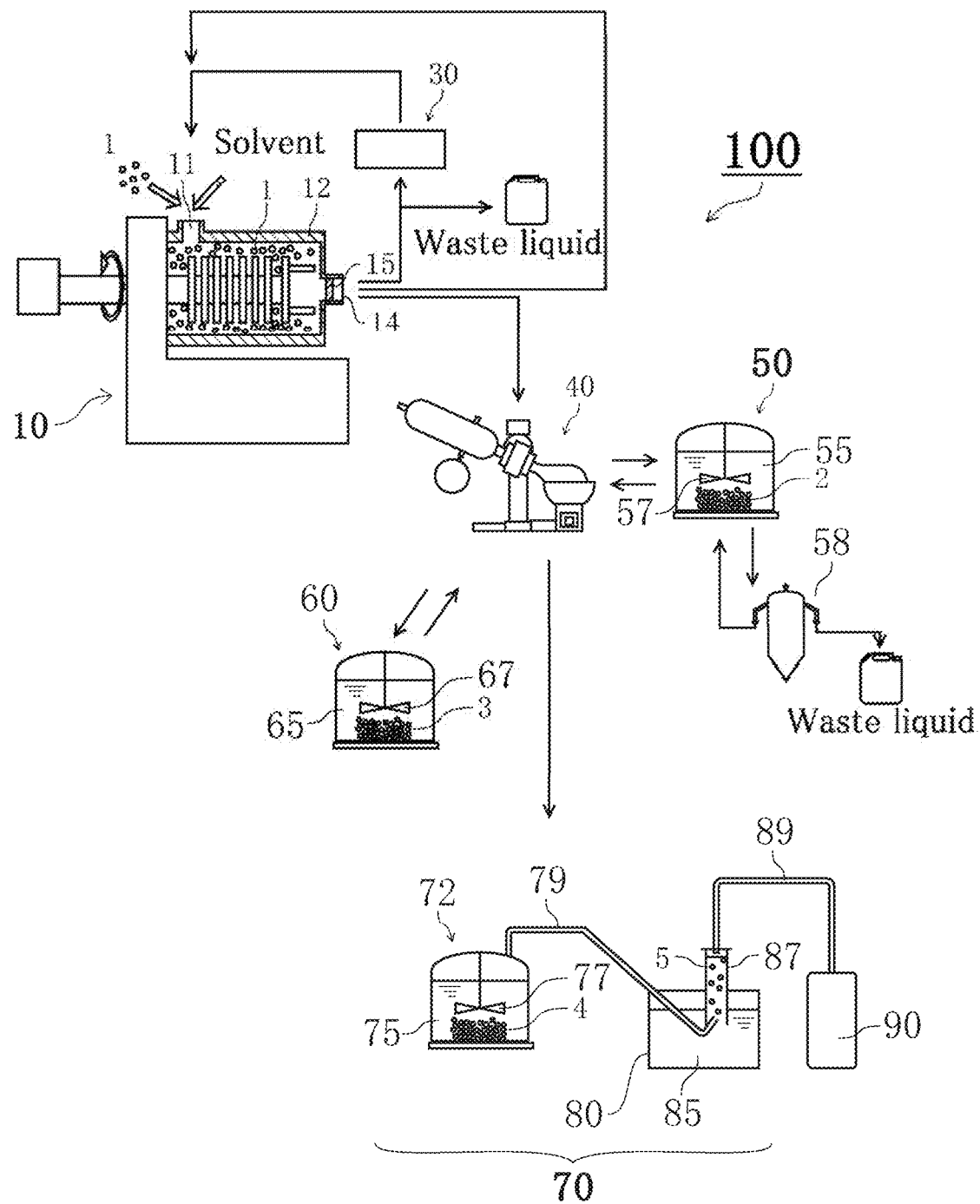
FIG. 4 is an explanatory view depicting a schematic configuration of a hydrogen production apparatus according to a fourth embodiment.

A hydrogen production apparatus 100 according to the present embodiment will be described below. FIG. 4 is an explanatory view depicting a schematic configuration of the hydrogen production apparatus 100 according to the present embodiment. As depicted in FIG. 4, the hydrogen production apparatus 100 according to the present embodiment mainly includes a grinder 10, a drying chamber 30, a rotary evaporator 40, a surface oxide film removal tank 50, a centrifuge 58, a hydrophilization treatment tank 60, a hydrogen generator 70, and a hydrogen reservoir 90. The hydrogen production apparatus 100 according to the present embodiment is regarded as including collective devices (treatment units) configured to execute a plurality of steps to be described later. The hydrogen production apparatus 100 may be called a hydrogen production system.

The grinder 10 according to the present embodiment is a wet grinder configured to receive a treatment target along with a liquid and apply grinding, dispersing, and the like to the treatment target in the liquid. The grinder 10 is configured to be capable of executing the steps of dispersing, mixing, grinding, etc., the treatment target and the liquid thus fed. The grinder 10 can be configured by any one selected from the grinder group consisting of a bead mill, a ball mill, a jet mill, and a shock wave grinder, or any one of combinations thereof. In the hydrogen production apparatus 100 according to the present embodiment, the grinder 10 serves as a washing unit configured to wash a silicon scrap material such as silicon chips or silicon grinding scraps generated in a silicon cutting process or the like, and a grinding unit configured to grind the washed silicon scrap material into silicon fine particles having a crystallite diameter of 100 nm or less.

The grinder 10 initially receives a silicon scrap material 1 as a treatment target and the second liquid according to the first embodiment through an input port 11 and washes the silicon scrap material 1. The washed silicon scrap material 1 as well as the second liquid are caused to pass through a filter 15 provided adjacent to a discharge port 14, so that the second liquid is removed as waste liquid by means of suction filtration. The residue (silicon scrap material 1) is subsequently dried in the drying chamber 30, and is fed into the grinder 10 through the input port 11 along with the second liquid so as to be ground. Specifically, the silicon scrap material 1 is roughly ground using a ball mill or the like and the ground object as well as the second liquid are caused to pass through the filter 15 for removal of rough particles. The filtrated ground object is then finely ground using a bead mill or the like. The finely ground object is subsequently collected and the second liquid is removed using the rotary evaporator 40 configured to automatically perform vacuum distillation, to obtain silicon fine particles 2.

The surface oxide film removal tank 50 exemplifying a surface oxide film remover according to the present embodiment includes an agitator 57 and treats the silicon fine particles 2 supplied from the grinder 10 with an aqueous hydrofluoric acid solution or an aqueous ammonium fluoride solution 55. The centrifuge 58 subsequently separates silicon fine particles 3 after surface oxide film removal from the aqueous hydrofluoric acid solution. In a case where the surface oxide films on the surfaces of the silicon fine particles 2 are not removed, the silicon fine particles 2 are fed to the hydrogen generator 70 to be described later.

The hydrophilization treatment tank 60 exemplifying a hydrophilization treatment unit according to the present embodiment includes an agitator 67 and causes the silicon fine particles 3 before or after surface oxide film removal to contact with and/or disperse in a fourth liquid 65 to which a surfactant or nitric acid is added. In a case where the silicon fine particles 2 are not subjected to the hydrophilization treatment, the silicon fine particles before or after surface oxide film removal are fed to the hydrogen generator 70 to be described later. Silicon fine particles before surface oxide film removal can be a target of hydrophilization treatment according to the present embodiment. In order for more reliable hydrophilization of the silicon fine particles, hydrophilization treatment is preferably applied to silicon fine particles after surface oxide film removal.

The hydrogen generator 70 according to the present embodiment includes a reaction tank 72 provided with an agitator 77, a water tank 80, a hydrogen collector 87, a transfer pipe 79, and a hydrogen pipe 89. In the reaction tank 72, at least one selected from the group consisting of the silicon fine particles 2, the silicon fine particles 3 after surface oxide film removal, and silicon fine particles 4 after hydrophilization treatment are caused to contact with and/or disperse in water or an aqueous solution 75 to generate hydrogen 5. The generated hydrogen 5 is fed into water 85 in the water tank 80 via the transfer pipe 79. The hydrogen 5 collected by the hydrogen collector 87 in accordance with an exemplary water substitute method is collected into the hydrogen reservoir 90 via the hydrogen pipe 89.

The hydrogen production apparatus 100 according to the present embodiment can achieve relatively fast production of a practically adequate amount of hydrogen from a start material of silicon chips or silicon grinding scraps that are obtained by silicon cutting in a production process of semiconductor products or the like and are ordinarily regarded as waste.

EXAMPLES

Examples will be described below for more detailed description of the above embodiments, but the above embodiments should not be limited to these examples. Examples 1 to 5 to be described below refer to results of hydrogen production tests using the hydrogen production apparatus 100.

Example 1

In Example 1, the hydrogen production apparatus 100 produced hydrogen in accordance with the hydrogen production method of the first embodiment. Specifically, the hydrogen generating step was executed after the washing step and the grinding step.

(1) Washing Step

Two hundred grams (g) of silicon chips was added to 200 milliliters (mL, also expressed as "ml") of acetone, and dispersed for one hour by using a ball mill. Used as the ball mill was a Universal BALL MILL manufactured by MASUDA CORPORATION. The ball mill contained alumina beads having particle diameters of 10 millimeters (mm) and 20 mm. The liquid was then removed by means of suction filtration and the residue was dried using a drier set to 40° C.

(2) Grinding Step

Subsequently, 15 g of washed silicon sludge is weighed and placed in a plastic container, to which 285 g of 2-propanol was added. Alumina balls are then placed in a ball mill to perform rough grinding at a circumferential speed of 80 rpm for two hours. Used as the ball mill in the present example is a Universal BALL MILL manufactured by MASUDA CORPORATION. The balls used in the present example are alumina balls having particle diameters of 10 mm and 20 mm. The resultant obtained in the grinding step was caused to pass through a mesh filter of 180 μm for removal of coarse particles.

Alumina balls were then placed in a bead mill to perform fine grinding at a circumferential speed of 2908 rpm for four hours. The bead mill used in the present example is a star mill LMZ015 manufactured by Ashizawa Finetech Ltd. Used in the present example were 456 g of zirconia beads having a particle diameter of 0.5 mm. The finely ground particles were then collected and 2-propanol was removed using a rotary evaporator to obtain silicon fine particles.

(3) Hydrogen Generating Step

Immersed in 50.21 g of ultrapure water were 0.86 g of silicon fine particles for hydrogen production. The test was executed at normal temperature (about 25° C.) in the present example.

Example 2

In Example 2, the hydrogen production apparatus 100 produced hydrogen in accordance with the hydrogen production method of the second embodiment. Example 2 was performed in the same manner as in Example 1 except that the surface oxide film removing step was additionally executed after the grinding step of Example 1. Specifically, hydrogen was produced through the washing step, the grinding step, the surface oxide film removing step, and the hydrogen generating step in the mentioned order. The surface oxide film removing step is executed in the following manner.

In the surface oxide film removing step, the silicon fine particles obtained in the grinding step of the present example are dispersed in a 50% aqueous hydrofluoric acid solution. Subsequently, the silicon fine particles are separated from the aqueous hydrofluoric acid solution by using a centrifuge. The obtained silicon fine particles were then immersed in an ethanol solution. The ethanol solution was subsequently removed to obtain silicon fine particles for hydrogen production.

Example 3

In Example 3, the hydrogen production apparatus 100 produced hydrogen in accordance with the hydrogen production method of the third embodiment. Example 3 was performed in the same manner as in Example 2 except that the hydrophilization treatment step of treating using a surfactant was additionally executed after the surface oxide film removing step of Example 2.

Specifically, the washing step, the grinding step, and the surface oxide film removing step were executed in the same manner as in Example 2. In the hydrophilization treatment step with use of the surfactant, 2-propanol as the fourth liquid of the third embodiment was prepared to include silicon fine particles at a concentration of 5 wt %. Added to this liquid was 0.05% polyoxyethylene nonyl phenyl ether ("Nonion NS206" produced by NOF CORPORATION) as a nonionic surfactant, and the obtained liquid was agitated for one hour. Subsequently, 2-propanol was removed using a rotary evaporator.

In the hydrogen generating step, 50.21 g of ultrapure water was added to 0.86 g of silicon fine particles for hydrogen production to immerse the silicon fine particles at normal temperature.

Example 4

Example 4 was performed in the same manner as in Example 2 by using the hydrogen production apparatus 100 except that a buffer solution containing 0.1 mol/L of sodium bicarbonate and 0.1 mol/L of sodium carbonate was used to adjust the pH value of the aqueous solution for the hydrogen generating step to 10 in the hydrogen production method according to the second embodiment.

Example 5

Example 5 was performed in the same manner as in Example 2 by using the hydrogen production apparatus 100 except that 0.1 mol/L of an aqueous potassium hydroxide solution was used to adjust the pH value of the aqueous solution for the hydrogen generating step to 13 in the hydrogen production method according to the second embodiment.

ANALYSIS RESULTS OF EXAMPLES

1. Crystal Structure Analysis Using Sectional TEM Photographs

Figure 5A:
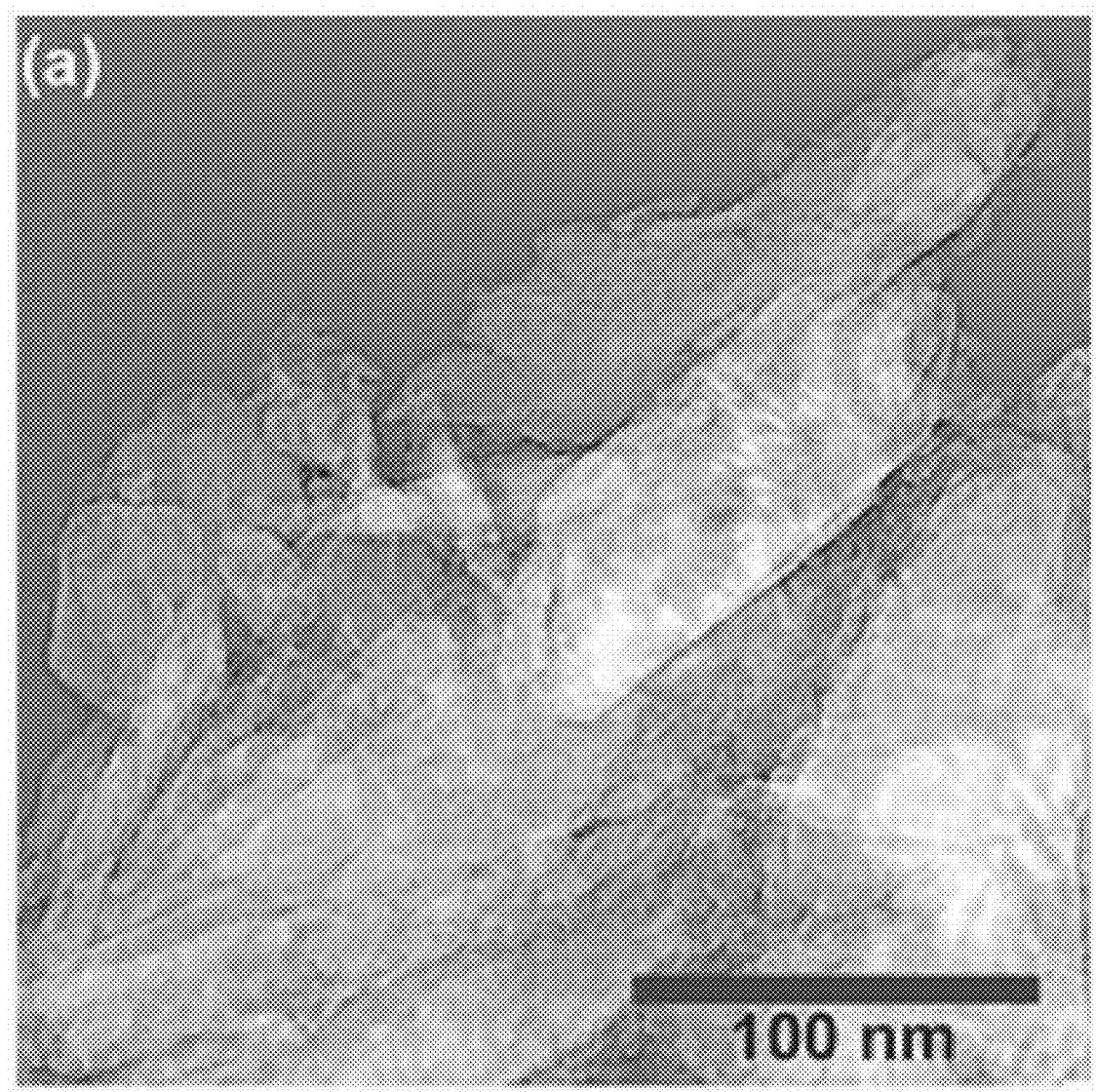
FIG. 5A and FIG. 5B are sectional TEM (transmission electron microscope) photographs each depicting a crystal structure of silicon fine particles after the grinding step in Example 1.
Figure 5B:
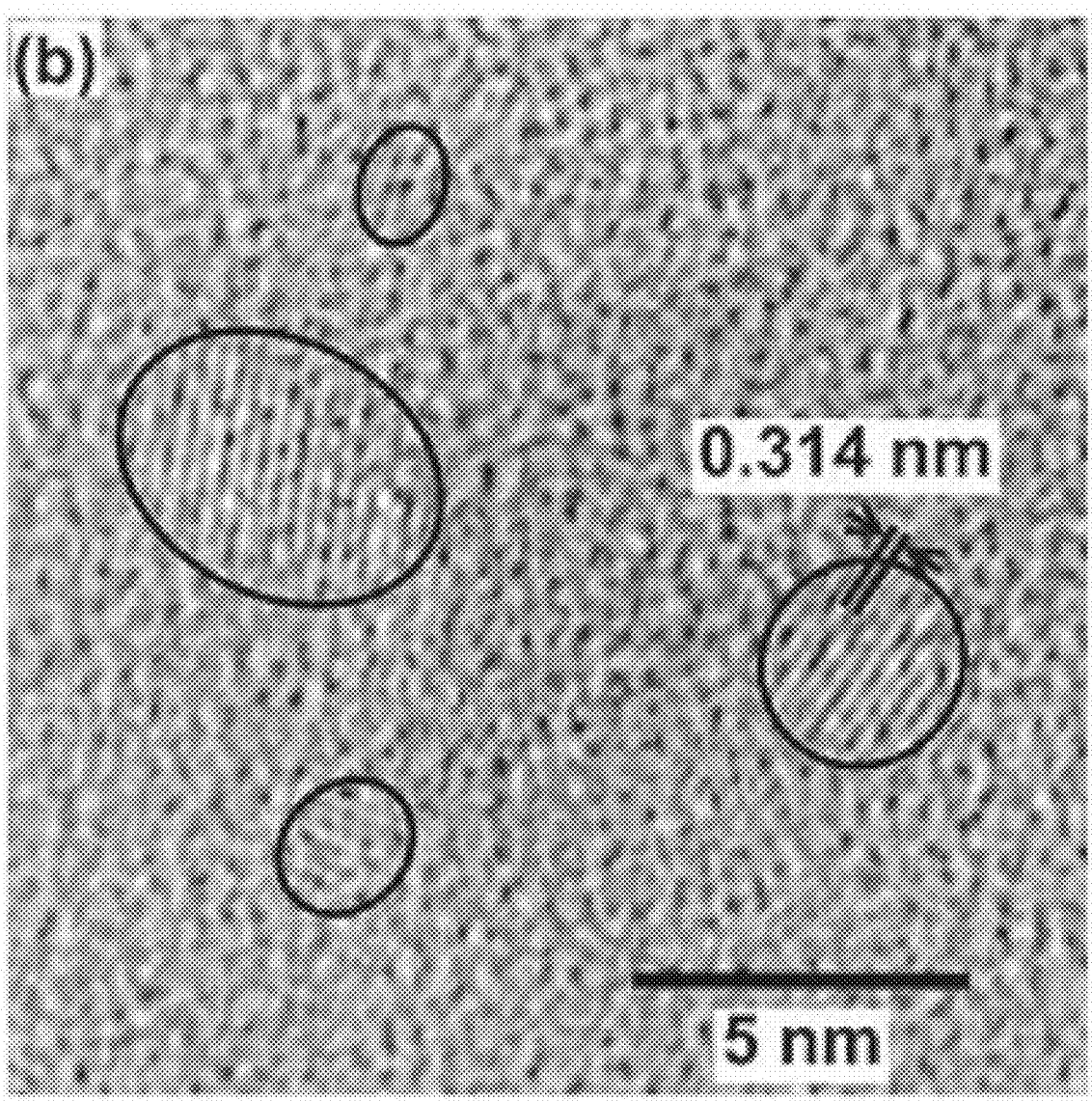

FIG. 5A and FIG. 5B are sectional TEM (transmission electron microscope) photographs each depicting a crystal structure of silicon fine particles after the grinding step in Example 1. FIG. 5A depicts a state where the silicon fine particles are partially aggregated to form slightly larger fine particles in amorphous shapes. On the other hand, FIG. 5B is a TEM photograph focusing on the individual silicon fine particles. As indicated in a central circle in FIG. 5B, there was found a silicon fine particle having a diameter of about 5 nm or less. It was also found that this silicon fine particle has a crystalline property.

Figure 6:
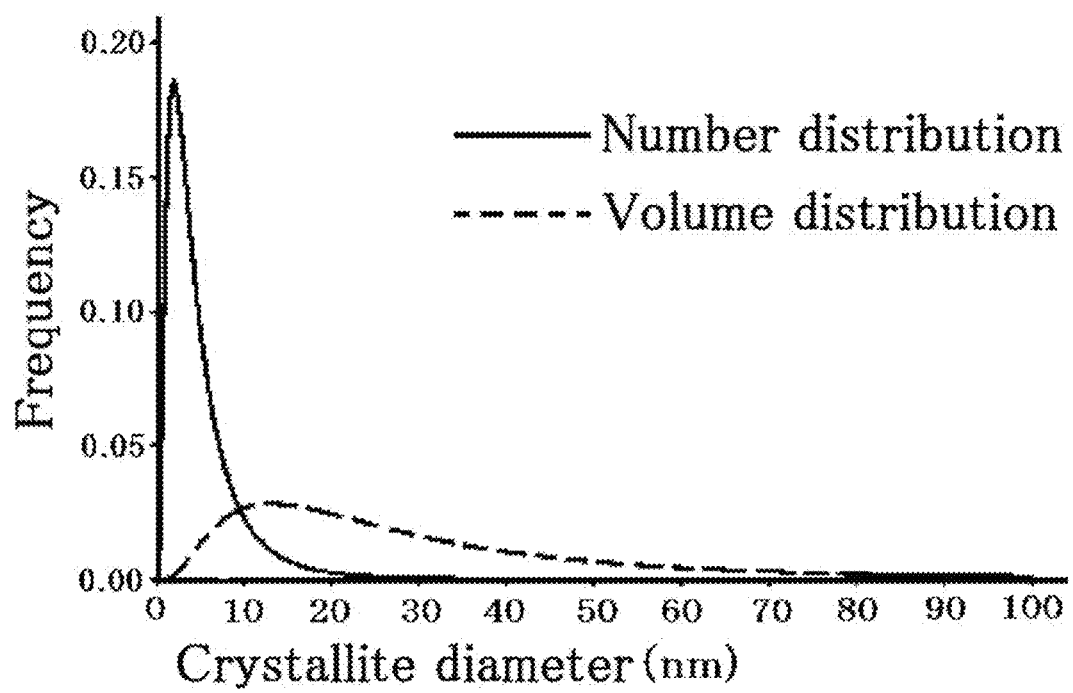
FIG. 6 is a crystallite diameter distribution graph of silicon fine particles after the grinding step.

2. Crystallite Diameter Distribution of Silicon Fine Particles in Accordance with X-Ray Diffraction Method FIG. 6 is a graph of analysis results according to the X-ray diffraction method, on crystallite diameter distribution of silicon fine particles after the grinding step. The graph in FIG. 6 has the transverse axis indicating the crystallite diameter (nm) and the ordinate axis indicating frequency. The solid line indicates number-based crystallite diameter distribution whereas the broken line indicates volume-based crystallite diameter distribution. According to the number distribution, the crystals had a mode diameter of 1.97 nm, a median diameter (50% crystallite diameter) of 3.70 nm, and an average diameter of 5.1 nm. According to the volume distribution, the crystals had a mode diameter of 13.1 nm, a median diameter of 24.6 nm, and an average diameter of 33.7 nm. It was found from these results that the silicon fine particles obtained after the grinding step according to the bead mill method are so-called silicon nanoparticles having crystallite diameters that are in the range of 100 nm or less, and are distributed particularly in the range of 50 nm or less.

3. Hydrogen Production Amount

Figure 7:
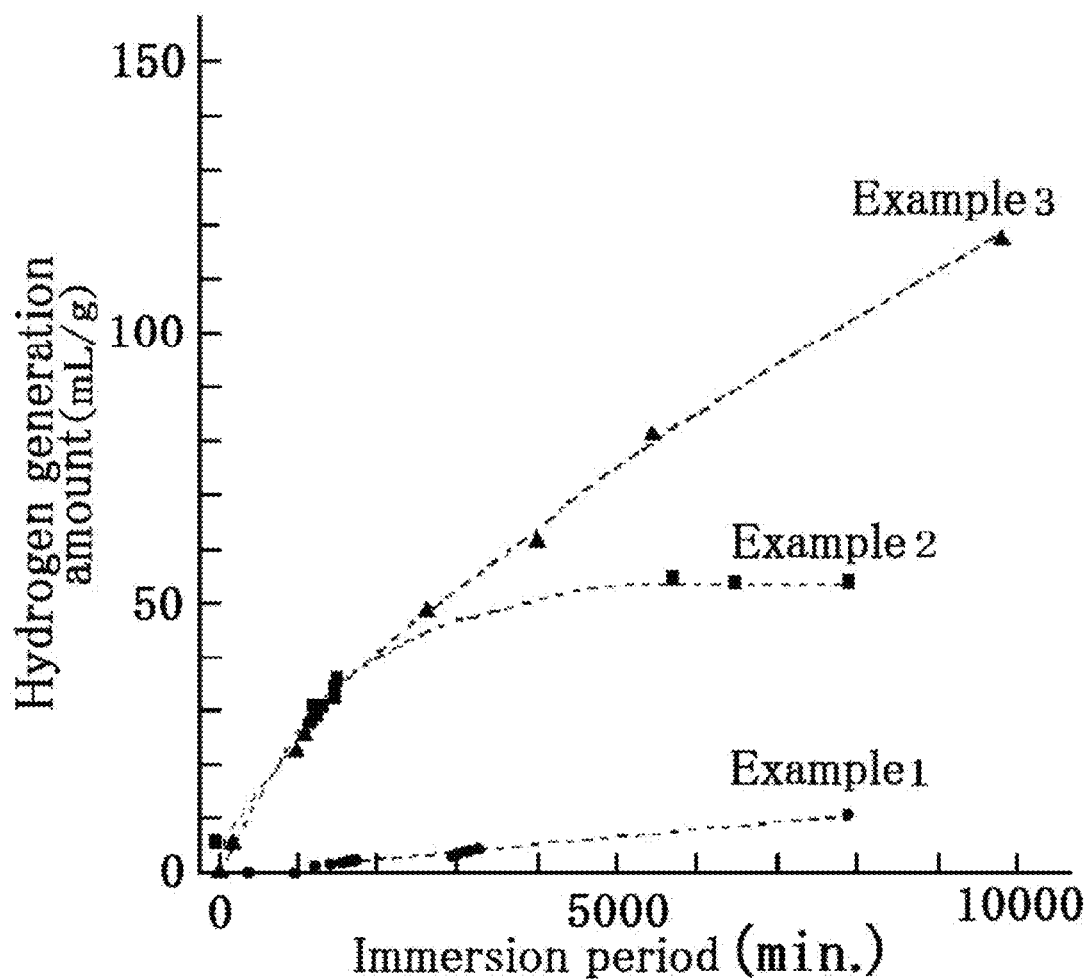
FIG. 7 is a graph of hydrogen generation amounts according to Examples 1 to 3.

FIG. 7 is a graph of measurement results of hydrogen generation amounts according to Examples 1 to 3. The graph in FIG. 7 has the transverse axis indicating the immersion period (minute) and the ordinate axis indicating the hydrogen generation amount (mL/g) per g of silicon fine particles for hydrogen production.

As indicated in FIG. 7, in Example 1 not including the surface oxide film removing step, 10.7 ml of hydrogen was obtained for the immersion period of 7905 minutes.

As indicated in FIG. 7, in Example 2 in which the hydrogen production apparatus 100 produced hydrogen in accordance with the hydrogen production method of the second embodiment, the reaction came into an equilibrium state after the immersion period of 5700 minutes (i.e., 95 hours), and about 54.1 mL of hydrogen was obtained. In Example 1, a large amount as much as 50 mL to 60 mL of hydrogen was finally produced per g of silicon fine particles for hydrogen production, as a significantly preferred result.

In Example 3, 116.7 mL of hydrogen was obtained by immersion for 9805 minutes (i.e., about 163 hours), as a more preferred result in comparison to Example 2. It is particularly found that the hydrogen generation amounts of Examples 2 and 3 for 500 minutes or 1000 minutes from the start of reaction are much more than the hydrogen generation amount of Example 1. In other words, it is found that Examples 2 and 3 achieve extremely fast hydrogen generation speed for 500 minutes or 1000 minutes from the start of reaction. FIG. 7 thus indicates the significant effect of the surface oxide film removing step or the surface oxide film remover.

Figure 8:
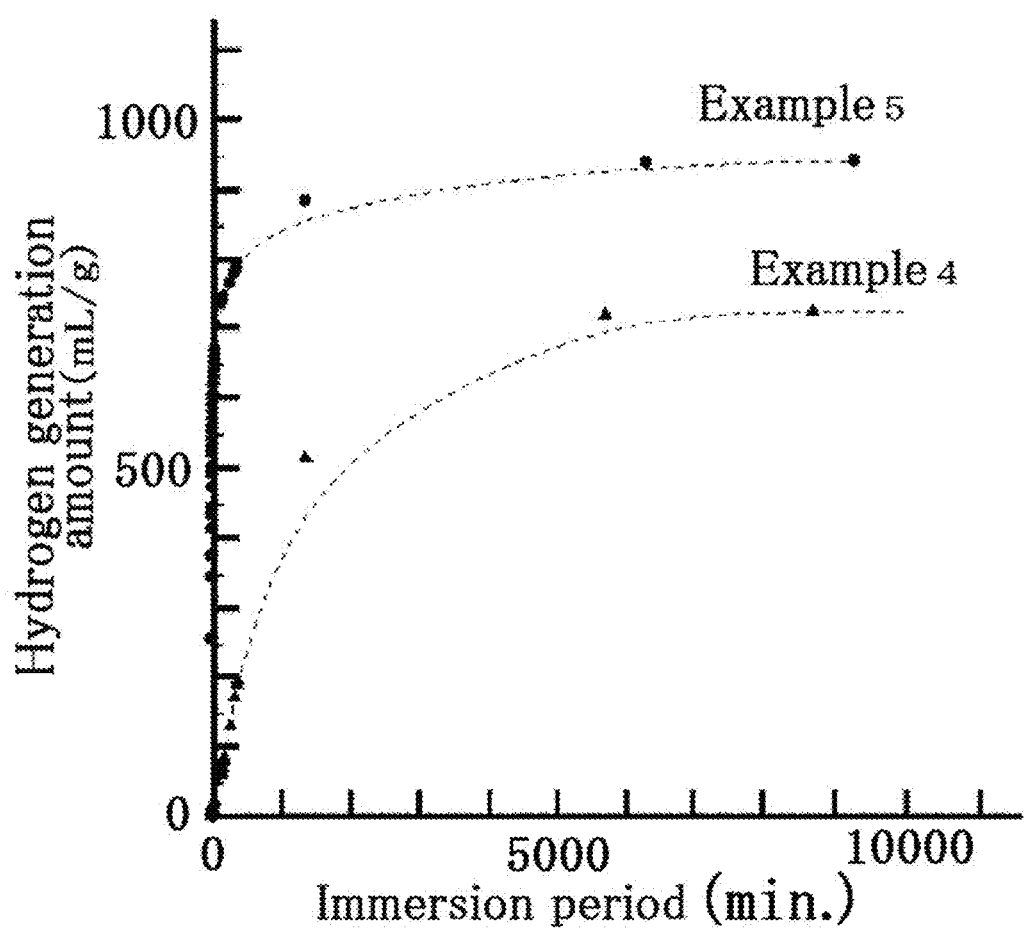
FIG. 8 is a graph of hydrogen generation amounts according to Examples 4 and 5.
Figure 9:
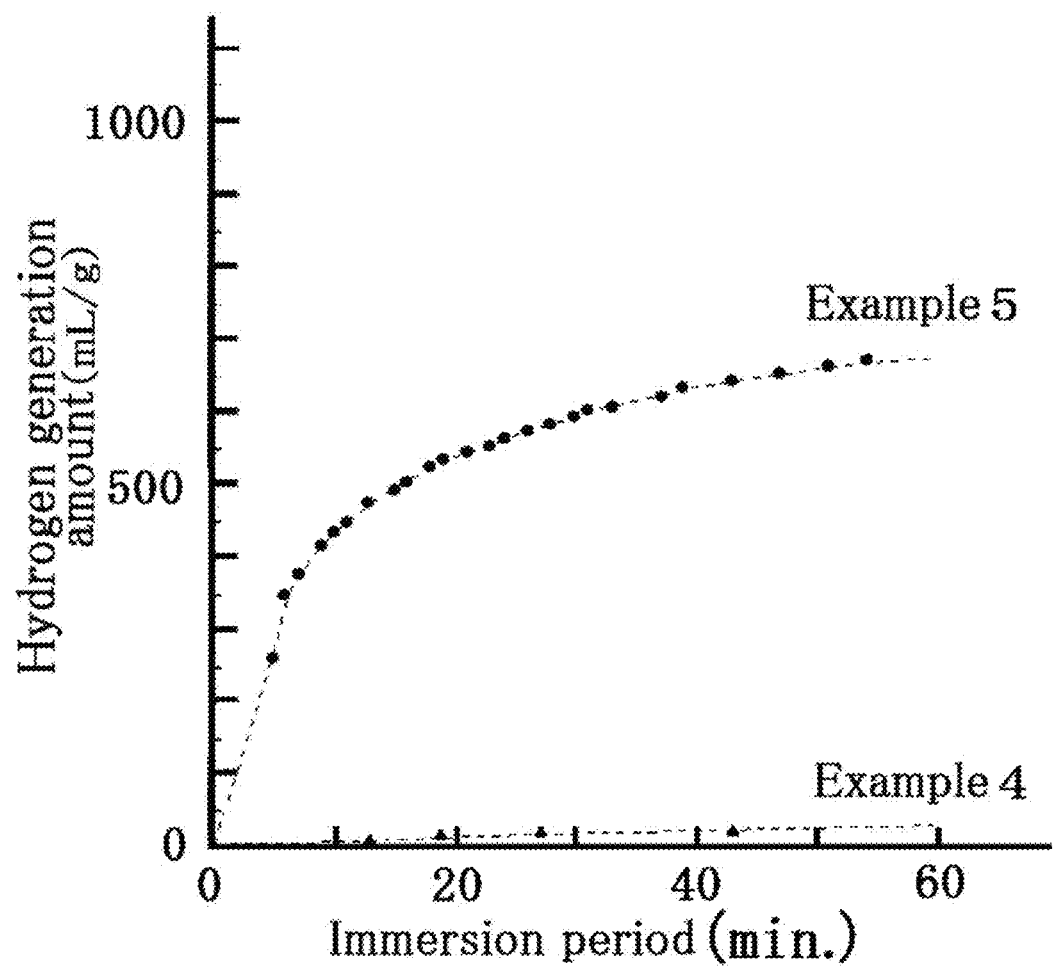
FIG. 9 is a graph of hydrogen generation amounts immediately after the start of reaction in Examples 4 and 5.

Subsequently studied were results of Examples 4 and 5 including the hydrogen generating step of causing silicon fine particles to react with an aqueous solution having a high pH value. FIG. 8 is a graph of measurement results of hydrogen generation amounts according to Examples 4 and 5. FIG. 9 is a graph of hydrogen generation amounts for 60 minutes from the start of reaction in Examples 4 and 5. The graphs in FIGS. 8 and 9 each have the transverse axis indicating the immersion period (minute) and the ordinate axis indicating the hydrogen generation amount (mL/g) per g of silicon fine particles for hydrogen production.

As indicated in FIG. 8, in Example 4 including the hydrogen generating step with use of the aqueous solution having a pH value of 10, the reaction came into a substantially equilibrium state after 5000 minutes (about 80 hours), and about 720 ml of hydrogen was obtained per g of silicon fine particles for hydrogen production. In contrast, in Example 5 including the hydrogen generating step with use of the aqueous solution having a pH value of 13, the reaction came into a substantially equilibrium state after 6254 minutes (about 104 hours), and about 942.1 ml of hydrogen was obtained per g of silicon fine particles for hydrogen production. In such a case where the aqueous solution was brought into an alkaline state so as to have a pH value of 10 or 13, there was obtained a large amount of hydrogen as much as several to several ten times in comparison to hydrogen obtained in Examples 1 to 3.

As indicated in the result of Example 5 in FIG. 9, with use of the aqueous solution having a pH value of 13 in the hydrogen generating step, the hydrogen generation amount rapidly increased immediately after the start of reaction between silicon fine particles and the aqueous solution. More specifically, about 470 ml of hydrogen was generated per g of silicon fine particles for hydrogen production for 10 minutes, and about 590 ml of hydrogen was generated per g of silicon fine particles for hydrogen production for 30 minutes. Furthermore, in Example 4 including the hydrogen generating step with use of the aqueous solution having a pH value of 10, about 3.5 ml of hydrogen was generated per g of silicon fine particles for hydrogen production for 13 minutes and about 15 ml of hydrogen was generated per g of silicon fine particles for hydrogen production for 30 minutes. Example 4 could achieve generation of a larger amount of hydrogen in a shorter period of time in comparison to Examples 1 to 3, although the reaction of Example 4 is more moderate than that of Example 5.

It was thus found from FIGS. 8 and 9 that Examples 4 and 5 achieve hydrogen generation speed much faster than that of Examples 1 to 3. Accordingly, it was found that increase in pH value (that is, adjusted to a pH value of 10 or more) of the aqueous solution used in the hydrogen generating step achieves reaction promoting fast hydrogen generation in a short period of time, unlike moderate hydrogen generation reaction for a long period of time as in Examples 1 to 3. According to a very preferred aspect, the pH value of the aqueous solution used in the hydrogen generating step is set to 10 or more (14 or less) in terms of faster generation of a larger amount of hydrogen.

The hydrogen production method and the hydrogen production apparatus disclosed in each of the above embodiments are largely expected to be applied to a technical field requiring hydrogen such as fuel cells. The hydrogen production method and the hydrogen production apparatus according to each of the above embodiments have an interesting point that silicon chips or silicon grinding scraps are utilized as a start material, which are obtained by silicon cutting in a production process of semiconductor products or the like and are ordinarily regarded as waste. The cost for production of hydrogen per unit gram is thus much cheaper than the cost for production of hydrogen according to a conventional hydrogen production method. Accordingly, this not only contributes to environmental protection through effective utilization of waste but also markedly improves economic efficiency of hydrogen production. Furthermore, the hydrogen production method and the hydrogen production apparatus according to each of the above embodiments do not require any complicated device, facility, or system, or any complicated step, and can thus significantly contribute to improvement in industrial productivity.

Other Embodiments

In the reaction tank 72 of the hydrogen generator 70 according to the fourth embodiment, at least one selected from the group consisting of the silicon fine particles 2, the silicon fine particles 3 after surface oxide film removal, and the silicon fine particles 4 after hydrophilization treatment are caused to contact with and/or disperse in the water or the aqueous solution 75 to generate hydrogen. However, the reaction may come into an equilibrium state with elapse of time to saturate the hydrogen generation amount or the hydrogen generation speed. Disclosed as a solution to the problem are the configuration of a hydrogen production apparatus 200 according to a modification example of the fourth embodiment as depicted in FIG. 10 as well as Example 6.

Figure 10:
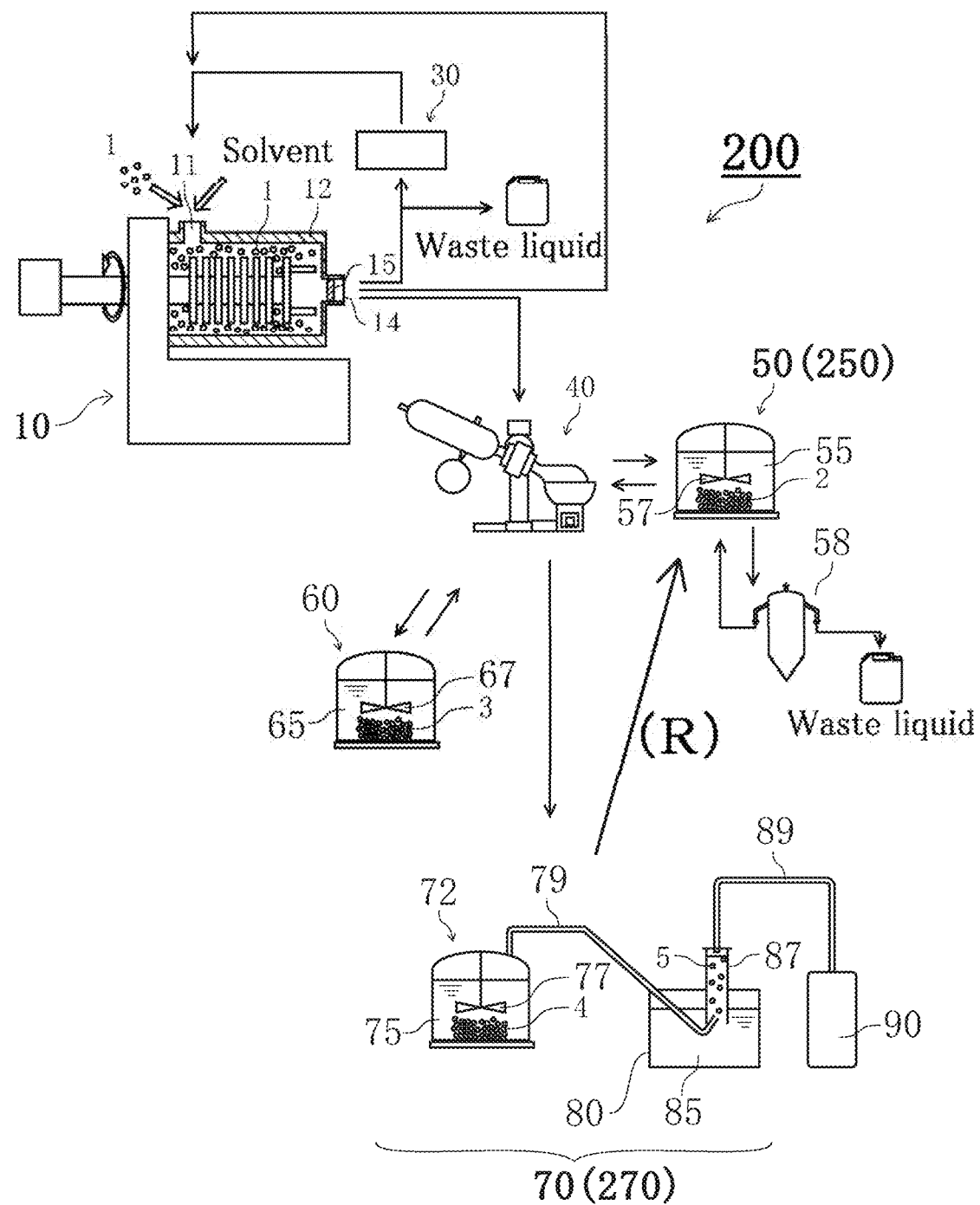
FIG. 10 is an explanatory view depicting a schematic configuration of a hydrogen production apparatus according to a modification example of the fourth embodiment.

FIG. 10 is an explanatory view depicting a schematic configuration of the hydrogen production apparatus 200 according to the modification example of the fourth embodiment. The hydrogen production apparatus 200 according to the present embodiment is similar to the hydrogen production apparatus 100 according to the fourth embodiment except for including an additional hydrogen generator 270. As indicated by an arrow (R) in FIG. 10, the additional hydrogen generator 270 executes the step of removing oxide films on the surfaces of silicon fine particles by extracting from the reaction tank 72 the silicon fine particles having a hydrogen generation amount or hydrogen generation speed once saturated or almost saturated and then introducing the silicon fine particles into an additional surface oxide film removal tank 250 configuring at least partially an additional surface oxide film remover in the hydrogen production apparatus 200 (the additional surface oxide film removing step) and the subsequent step of generating hydrogen by feeding the silicon fine particles, of which oxide films are removed, again into the reaction tank 72 (the additional hydrogen generating step). Accordingly, the overlapped description may not be disclosed repeatedly.

In the case where the hydrogen production apparatus 200 depicted in FIG. 10 is used, even if the hydrogen generation amount or the hydrogen generation speed is saturated or about to be saturated because the reaction in the reaction tank 72 once comes into an equilibrium state, the additional surface oxide film removing step subsequently executed revitalizes hydrogen generation power of the silicon fine particles. The hydrogen generation power of the silicon fine particles is revitalized or recovered by executing the additional surface oxide film removing step of causing the silicon fine particles to contact again with an aqueous hydrofluoric acid solution or an aqueous ammonium fluoride solution during or after the hydrogen generating step in each of the above embodiments. Accordingly, this markedly improves utilization efficiency of silicon fine particles for hydrogen generation as well as significantly contributes to reduction in hydrogen production cost.

According to a different adoptable aspect, unlike the hydrogen production apparatus 200, there can be provided a means for supplying silicon fine particles into the surface oxide film removal tank 50 via a flow path connecting the reaction tank 72 and the surface oxide film removal tank 50 after the silicon fine particles in the reaction tank 72 are separated from the water or the aqueous solution 75 by a filter. The silicon fine particles introduced into the surface oxide film removal tank 50 in such an aspect are also included in "silicon fine particles extracted from the hydrogen generator" in the present application. According to a different adoptable aspect, the hydrophilization treatment step (the additional hydrophilization treatment step) is executed after the additional surface oxide film removing step, as in the fourth embodiment.

In this aspect, the surface oxide film removing step and the additional surface oxide film removing step are executed using the same surface oxide film removal tank, and the hydrogen generating step and the additional hydrogen generating step are executed using the same reaction tank 72. However, this aspect is not limited to this case. The surface oxide film removing step and the additional surface oxide film removing step may be executed in different tanks, and the hydrogen generating step and the additional hydrogen generating step may be executed in different tanks.

Example 6

In the hydrogen generating step according to Example 6, immersed in the aqueous solution (0.1 mol/L of an aqueous potassium hydroxide solution) 75 was 0.86 g of silicon fine particles, which were formed by grinding p-type silicon chips using a bead mill including beads made of $ZiO_2$ in the same manner as in Example 5. Prepared in Example 6 were four types of aqueous solutions 75 having pH values of 12.1, 12.9, 13.4, and 13.9 with different addition amounts of potassium hydroxide (KOH).

Figure 11:
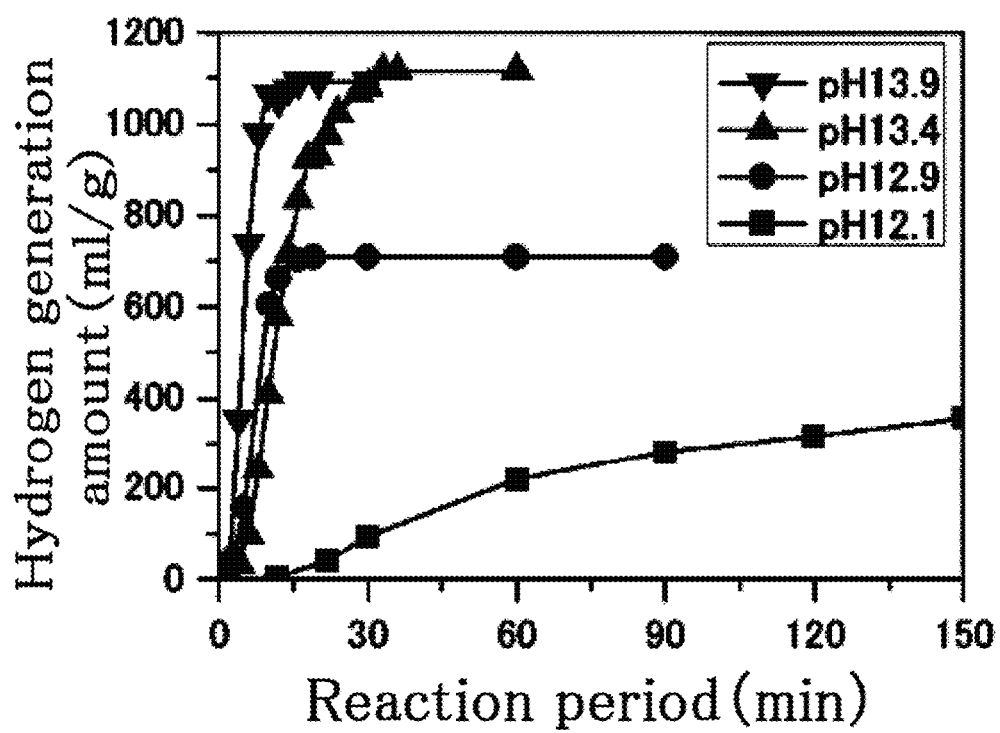
FIG. 11 is a graph of a hydrogen generation amount with respect to a reaction period in Example 6.

The constant amount (0.86 g) of silicon fine particles were immersed in each of the aqueous solutions at normal temperature to obtain the graph of hydrogen generation amounts with respect to a reaction period as in FIG. 11. In the case where the pH value is 13.9, it was found that the hydrogen generation amount per gram (g) of the silicon fine particles reached about 1100 mL or more (i.e., about 1100 mL/g or more) within an extremely short period of time (within about 15 minutes from the start of reaction). It is noted that the hydrogen generation amount at the pH value of 13.9 exceeded 1000 mL per g of the silicon fine particles in the period as short as about ten minutes. Neither the additional surface oxide film removing step nor the additional hydrogen generating step is executed at this stage.

Figure 12:
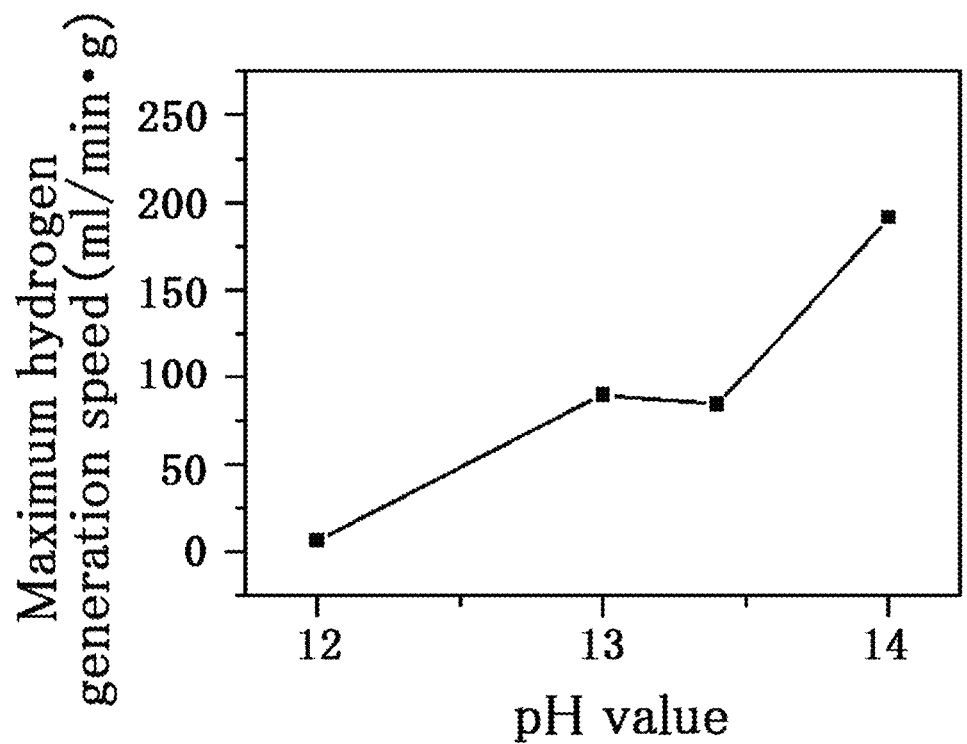
FIG. 12 is a graph of a difference in maximum hydrogen generation speed due to a difference in pH value in Example 6.

FIG. 12 is a graph of a difference in maximum hydrogen generation speed due to a difference in pH value in Example 6. The numerical values in FIG. 12 indicate maximum hydrogen generation speed per g in one minute in the four aqueous solutions having the different pH values indicated in FIG. 11. It was found from the result indicated in FIG. 12 that the maximum hydrogen generation speed per g in one minute is clearly dependent on the pH value and increases as the pH value is larger. The hydrogen generation speed can be controlled in accordance with the feature that hydrogen generation speed is dependent on the pH value of a solution. Again, neither the additional surface oxide film removing step nor the additional hydrogen generating step is executed at this stage.

Figure 13:
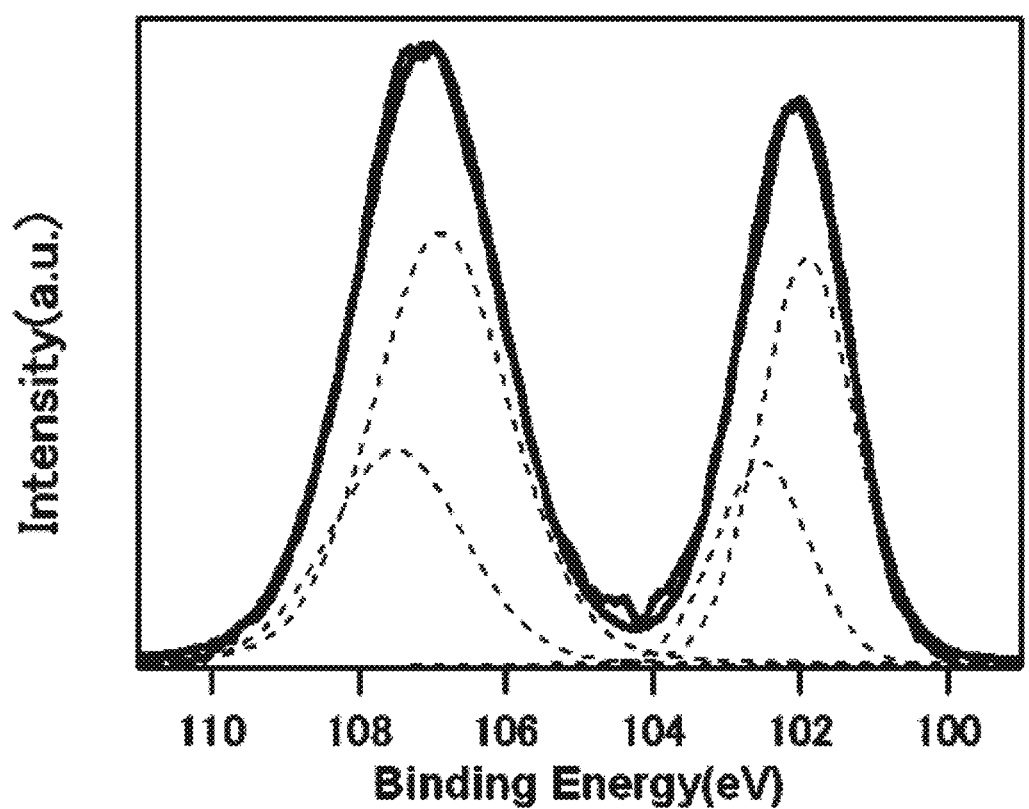
FIG. 13 is an XPS spectrography of silicon fine particles after hydrogen generation reaction in Example 6.

The silicon fine particles, which have a saturated hydrogen generation amount or saturated hydrogen generation speed because reaction comes into an equilibrium state in the case where the pH value is 13.9, were measured and analyzed using an XPS (X-ray photoelectron spectroscopy) analyzer. FIG. 13 is an XPS spectrography of the silicon fine particles after the hydrogen generation amount or the hydrogen generation speed is saturated in Example 6.

As indicated in FIG. 13, there was observed a plurality of $Si_{2p}$ peaks belonging to silicon (Si) and silicon dioxide ($SiO_2$). It was thus found that the silicon fine particles already or almost having reacted into an equilibrium state are formed with silicon dioxide ($SiO_2$) films on the surfaces of the particles. According to the peak intensity ratio between (Si) and ($SiO_2$) indicated in FIG. 13, it was concluded that the silicon fine particles are formed with $SiO_2$ films of about 5 nm thick on the surfaces of the particles.

Example 6 includes the step of removing the $SiO_2$ films by causing the silicon fine particles already or almost having reacted into an equilibrium state to contact with a 5% aqueous HF solution (the additional surface oxide film removing step). Subsequently, the silicon fine particles were immersed again in the aqueous solution 75 having a pH value of 13.9. The silicon fine particles then generated further 470 ml/g of hydrogen (per g of the initial silicon fine particles) (the additional hydrogen generating step).

In Example 6, the sum of the initial hydrogen gas generation amount (until the saturated state) and the hydrogen gas generation amount after the additional surface oxide film removing step and the additional hydrogen generating step was about 1570 mL per g of the silicon fine particles. This is approximate to 1600 mL (theoretical value) as the maximum generation amount of hydrogen that can be generated in reaction with 1 g of silicon in the aqueous solution 75. It was thus found that the additional surface oxide film removing step and the additional hydrogen generating step were quite useful measures for generation of an extremely large amount of hydrogen.

Example 7

Described next is a different result of a hydrogen production test by using the hydrogen production apparatus 100. In the hydrogen generating step according to Example 7, the aqueous solution 75 includes sodium hydroxide or ammonia. At normal temperature, 0.86 g of silicon fine particles was caused to contact with and/or disperse in the aqueous solution 75 so as to be caused to react.

Figure 14:
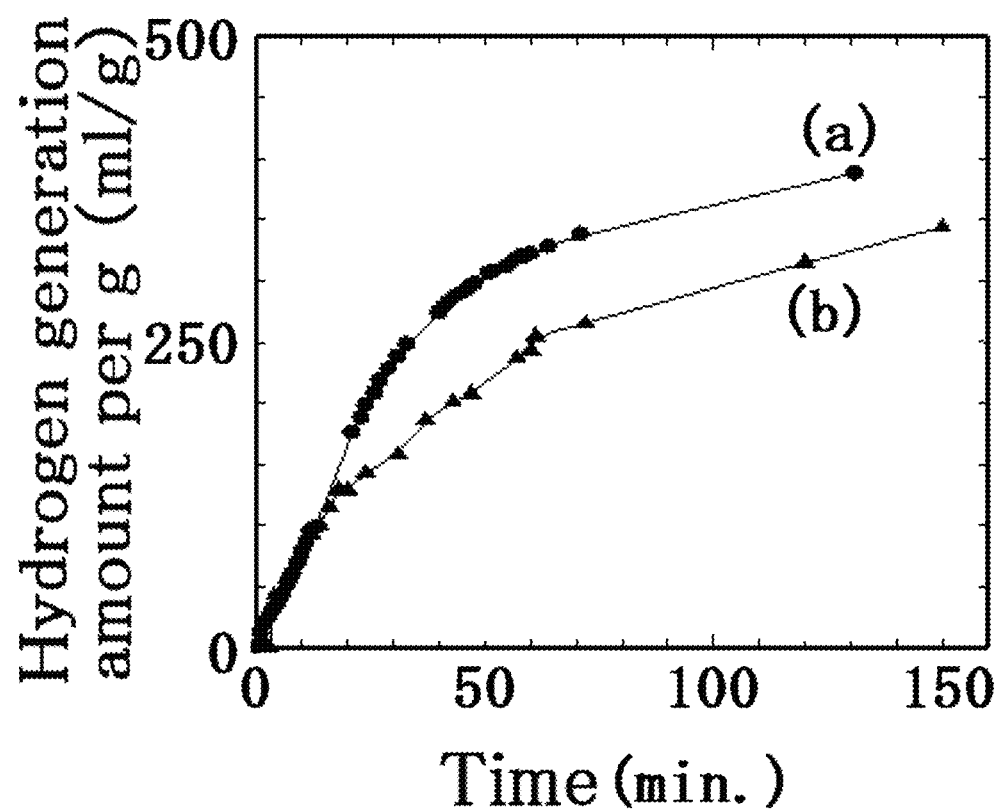
FIG. 14 is a graph of a hydrogen generation amount per 1 g with respect to a reaction period in Example 7.

FIG. 14 is a graph of the hydrogen generation amount per g with respect to a reaction period in Example 7. An experiment value (a) is obtained in a case of using 20 mL of an aqueous solution having a pH value of 13.4 to which sodium hydroxide (NaOH, also referred to as caustic soda) is added. An experiment value (b) is obtained in a case of using 20 mL of an aqueous solution having a pH value of 11.9 to which ammonia ($NH_3$) is added. The graph in FIG. 14 has the transverse axis indicating the immersion period (minute). The graph in FIG. 14 has the ordinate axis indicating the hydrogen generation amount (mL/g) per g of silicon fine particles for hydrogen production.

When the silicon fine particles are immersed in the aqueous solution 75 to which ammonia is added, the silicon fine particles may float on the surface of the solution if the silicon fine particles are not particularly treated preliminarily. For this reason, in Example 7, ethanol was added dropwise into the aqueous solution 75 to precipitate the silicon fine particles to the bottom of the reaction tank 72. This causes the silicon fine particles to contact with the aqueous solution 75 to which ammonia is added. On the other hand, in the case of using the aqueous solution 75 to which sodium hydroxide is added, the experiment was executed with the silicon fine particles caused to contact with and/or disperse in the aqueous solution 75, similarly to the case of using the solution to which potassium hydroxide is added.

As indicated in FIG. 14, it was found that the hydrogen generation amount or the hydrogen generation speed can be controlled by changing the type or the pH value of the aqueous solution. According to an adoptable and very preferred aspect, the hydrogen generation speed and/or the hydrogen generation amount is adjusted by changing the pH value of the water or the aqueous solution 75 in the hydrogen generating step in each of the above embodiments. Similarly, according to an adoptable and very preferred aspect, the hydrogen generator 70 in the hydrogen production apparatus 100 or the additional hydrogen generator 270 in the hydrogen production apparatus 200 further includes an adjuster configured to adjust the hydrogen generation speed and/or the hydrogen generation amount by changing the pH value of the water or the aqueous solution 75.

For example, the adjuster can be configured by a device provided with a means for dropping a desired amount of the water or each of the aqueous solutions (the aqueous solution to which NaOH is added, the aqueous solution to which KOH is added, the aqueous solution to which $NH_3$ is added, and the like) having a variable pH value for a desired period of time, and a control means for controlling the pH value. More specifically, the dropping means can be configured to drop a desired amount of a chemical substance for adjusting the pH value, such as NaOH, KOH, or $NH_3$, for a desired period of time so as to achieve a desired pH value, upon receipt of a feedback measurement result from a measurement unit configured to measure the pH value of the water or each of the aqueous solutions 75.

On the other hand, in consideration of the results of the examples described above, the pH value is preferably set to 10 or more and more preferably to 11.9 or more in terms of obtaining a larger amount of hydrogen in a shorter period of time.

The silicon fine particles are treated using the aqueous hydrofluoric acid solution in the surface oxide film removing step according to each of the above examples. A preferred result similar to that of each of the examples can be achieved also in a case where the silicon fine particles are treated using an aqueous ammonium fluoride solution in place of or along with the aqueous hydrofluoric acid solution.

The silicon fine particles are treated using the surfactant in the hydrophilization treatment step according to the above example. A preferred result quite similar to that of the example can be achieved also in a case where the silicon fine particles are treated using nitric acid in place of or along with the surfactant.

In each of the above embodiments, the treatment using the surfactant or nitric acid may not be performed in the independent hydrophilization treatment step but can be performed during the hydrogen generating step by adding the surfactant or nitric acid to the water or the aqueous solution used in the hydrogen generating step.

As described in Example 6, when silicon fine particles are added into the water or the aqueous solution to be dispersed in the hydrogen generating step, the silicon fine particles dissolve in the water or the aqueous solution and are formed with silicic acid on the surfaces of the particles. The silicic acid is subsequently oxidized into silicon dioxide ($SiO_2$), so that hydrogen generation reaction is inactivated or terminated as time elapses. In order to suppress formation of silicon dioxide ($SiO_2$) on the surfaces of the silicon fine particles to continue hydrogen generation reaction, according to a different adoptable preferred aspect, a small amount of hydrofluoric acid is added into the water or the aqueous solution used in the hydrogen generating step to cause the silicon fine particles to contact with the water or the aqueous solution for continuous hydrogen generation reaction.

Each of the above embodiments adopts the hydrogen generator 70 or the additional hydrogen generator 270 configured to generate hydrogen from the formed silicon fine particles (or aggregate thereof) which are not positionally fixed but are caused to contact with and/or disperse in the water or the aqueous solution 75. However, the method of causing silicon fine particles to contact with the water or the aqueous solution 75 is not limited to the method described above. According to a different adoptable aspect, the formed silicon fine particles firmly fixed onto a surface of a solid object (e.g. a sponge body) are caused to contact with the water or the aqueous solution 75 so as to generate hydrogen. In a case where the solid object is made of a material that can absorb and hold a certain amount of liquid like the sponge body, generation of silicon dioxide ($SiO_2$) on the silicon fine particles can be suppressed more possibly by an aqueous hydrofluoric acid solution or an aqueous ammonium fluoride solution impregnated into the solid object.

The above embodiments are disclosed for description of these embodiments, not for limitation to the present invention. Furthermore, modification examples within the scope of the present invention, inclusive of other combinations of the embodiments, are also included in the claims.

The invention claimed is:
1. A hydrogen production method comprising:
a grinding step of grinding a silicon chip or a silicon grinding scrap to form silicon fine particles;
a surface oxide film removing step of causing the silicon fine particles formed in the grinding step to contact with an aqueous hydrofluoric acid solution or an aqueous ammonium fluoride solution;
a hydrophilization treatment step of hydrophilizing surfaces of the silicon fine particles having been caused to contact with the aqueous hydrofluoric acid solution or the aqueous ammonium fluoride solution, and
a hydrogen generating step of generating hydrogen by causing the silicon fine particles treated in the hydrophilization treatment step, to contact with as well as disperse in, or to contact with or dispersed in water or an aqueous solution.

2. The hydrogen production method according to claim 1, further comprising:
an additional surface oxide film removing step to be executed during or after the hydrogen generating step, of causing the silicon fine particles to contact again with an aqueous hydrofluoric acid solution or an aqueous ammonium fluoride solution; and
an additional hydrogen generating step to be executed after the additional surface oxide film removing step, of generating hydrogen by causing the silicon fine particles to contact with as well as disperse in, or to contact with or dispersed in the water or the aqueous solution again.

3. The hydrogen production method according to claim 1, wherein in the hydrogen generating step, at least one of hydrogen generation speed and a hydrogen generation amount is adjusted by changing a hydrogen ion concentration index (pH) of the water or the aqueous solution.

4. The hydrogen production method according to claim 1, wherein in the hydrophilization treatment step, the surfaces of the silicon fine particles are caused to contact with a surfactant or nitric acid.

5. The hydrogen production method according to claim 1, wherein the silicon fine particles have a crystallite diameter of 100 nm or less.

6. The hydrogen production method according to claim 1, wherein the aqueous solution used in the hydrogen generating step has a pH value of 10 or more.

* * * * *